United States Patent
Scolari et al.

(10) Patent No.: US 10,625,621 B2
(45) Date of Patent: Apr. 21, 2020

(54) ELECTRIC POWER SYSTEM PROVIDED WITH A DUAL-VOLTAGE STORAGE ASSEMBLY FOR A VEHICLE

(71) Applicant: MAGNETI MARELLI S.P.A., Corbetta (IT)

(72) Inventors: Stefano Scolari, San Lazzaro di Savena (IT); Giovanni Gaviani, Rimini (IT); Danilo Pritelli, Bologna (IT)

(73) Assignee: Magneti Marelli S.P.A., Corbetta (IT)

( * ) Notice: Subject to any disclaimer, the term of this patent is extended or adjusted under 35 U.S.C. 154(b) by 0 days.

(21) Appl. No.: 16/342,889

(22) PCT Filed: Oct. 20, 2017

(86) PCT No.: PCT/IB2017/056545
§ 371 (c)(1),
(2) Date: Apr. 17, 2019

(87) PCT Pub. No.: WO2018/073807
PCT Pub. Date: Apr. 26, 2018

(65) Prior Publication Data
US 2019/0263274 A1 Aug. 29, 2019

(30) Foreign Application Priority Data

Oct. 20, 2016 (IT) .................... 102016000105858

(51) Int. Cl.
*B60L 50/11* (2019.01)
*B60L 58/12* (2019.01)
(Continued)

(52) U.S. Cl.
CPC ............... *B60L 50/11* (2019.02); *B60L 58/12* (2019.02); *H02J 1/08* (2013.01); *H02J 7/14* (2013.01);
(Continued)

(58) Field of Classification Search
CPC .......... B60L 58/12; B60L 58/16; B60L 58/20; B60L 58/22; B60W 10/26
See application file for complete search history.

(56) References Cited

U.S. PATENT DOCUMENTS 7,933,695 B2 * 4/2011 Yamaguchi ............ B60K 6/365
701/22
7,997,364 B2 * 8/2011 Hashimoto ........... B60W 20/10
180/65.265

(Continued)

FOREIGN PATENT DOCUMENTS

DE 102014207390 A1 10/2015

OTHER PUBLICATIONS

International Search Report and Written Opinion of the International Searching Authority for PCT International Application No. PCT/IB2017/056545 dated Jan. 31, 2018.

(Continued)

*Primary Examiner* — Jeffrey J Restifo
(74) *Attorney, Agent, or Firm* — Howard & Howard Attorneys PLLC

(57) ABSTRACT

An electric power system for a vehicle provided with a storage assembly comprising a first storage system with a number of electrochemical cells connected to one another in series and/or in parallel and a second storage system arranged in series to the first system and with a number of electrochemical cells connected to one another in series and/or in parallel; wherein the storage assembly is designed to supply power with a dual voltage; and wherein the electric power system comprises, furthermore, a DC/DC converter, which is designed to transfer the electric charge from the second storage system to the first storage system, and vice versa, and integrated in a BMS device for the management of said storage assembly, which is designed to carry out the balancing of the electrochemical cells of the second storage (Continued)

system and to estimate the state of charge and the state of health of the two storage systems.

10 Claims, 3 Drawing Sheets

(51) Int. Cl.
    *H02J 7/14*         (2006.01)
    *H02M 3/158*     (2006.01)
    *H02J 1/08*         (2006.01)

(52) U.S. Cl.
    CPC ......... *H02J 7/1423* (2013.01); *H02M 3/1582* (2013.01); *H02J 1/082* (2020.01); *Y02T 10/7005* (2013.01)

(56) References Cited

U.S. PATENT DOCUMENTS

| | | | | |
|---|---|---|---|---|
| 8,473,136 B2* | 6/2013 | Kato | ..................... | B60W 10/26 701/22 |
| 8,532,854 B2* | 9/2013 | Tate, Jr. | ................. | B60L 58/12 701/22 |
| 8,583,307 B2* | 11/2013 | Kato | ..................... | B60W 20/10 701/22 |
| 8,989,939 B2* | 3/2015 | Aoki | ..................... | B60K 6/445 701/22 |
| 9,221,354 B2* | 12/2015 | Hatanaka | .................. | B60L 7/14 |
| 9,457,686 B2* | 10/2016 | Chang | .................... | B60L 58/16 |
| 9,862,275 B2* | 1/2018 | Cha | ....................... | B60L 3/0046 |
| 9,956,888 B2* | 5/2018 | Ando | ................... | B60L 11/1861 |
| 10,093,190 B2* | 10/2018 | Moro | ....................... | H02H 7/18 |
| 10,160,443 B2* | 12/2018 | Sugimoto | ............... | B60L 58/12 |
| 10,205,334 B2* | 2/2019 | Unno | ...................... | B60L 50/51 |
| 10,207,596 B2* | 2/2019 | Lin | ....................... | B60L 3/0046 |
| 10,220,831 B2* | 3/2019 | Colavincenzo | ....... | B60W 20/40 |
| 10,300,906 B2* | 5/2019 | Oguma | ................. | B60W 20/13 |
| 10,322,643 B2* | 6/2019 | Poirier | ..................... | B60K 6/28 |
| 10,385,818 B2* | 8/2019 | Kobayashi | ............. | B60K 6/543 |
| 10,479,180 B2* | 11/2019 | Colavincenzo | ........ | B60K 6/485 |
| 10,511,040 B2* | 12/2019 | Matsumoto | ....... | H01M 8/04619 |
| 2012/0319652 A1* | 12/2012 | Namou | ................... | H02J 1/108 320/116 |
| 2013/0116889 A1* | 5/2013 | Zhang | ...................... | H02J 1/08 701/36 |
| 2014/0070608 A1* | 3/2014 | Achhammer | ............. | H02J 1/08 307/10.1 |

OTHER PUBLICATIONS

Applicant's Demand for Preliminary Examination and Response to International Search Report and Written Opinion for PCT International Application No. PCT/IB2017/056545 filed Jun. 7, 2018.
Written Opinion of the International Preliminary Examining Authority for PCT International Application No. PCT/IB2017/056545 dated Oct. 8, 2018.
Applicant's Response to the Second Written Opinion for PCT International Application No. PCT/IB2017/056545 filed Nov. 26, 2018.
International Preliminary Report on Patentability for PCT International Application No. PCT/IB2017/056545 dated Jan. 30, 2019.

* cited by examiner

US 10,625,621 B2

ELECTRIC POWER SYSTEM PROVIDED WITH A DUAL-VOLTAGE STORAGE ASSEMBLY FOR A VEHICLE

CROSS-REFERENCE TO RELATED APPLICATIONS

The present application is a National Stage of International Patent Application No. PCT/IB2017/056545, filed on Oct. 20, 2017, which claims priority to and all the benefits of Italian Patent Application No. 102016000105858, filed on Oct. 20, 2016, both of which are hereby expressly incorporated herein by reference in their entirety.

TECHNICAL FIELD

The invention relates to an electric power system provided with a dual-voltage storage assembly for a vehicle.

BACKGROUND

For some years now, the market has been requesting that vehicles be provided with an electric power system supplied at 48 Volt. A 48 Volt power supply has many advantages compared to a 12 Volt power supply and allows manufacturers to significantly improve the performances of hybrid vehicles or of vehicles provided with Start & Stop systems (in particular, in relation to the recovery of braking energy) and, especially, to remarkably reduce the currents absorbed by on board electric loads, thus improving at the same time electric efficiency. As a matter of fact, over the years we experienced an increase in the use of electric loads in cars, which consume high powers, in particular at low temperatures, and, therefore, when they are powered with a 12 Volt voltage, definitely absorb high currents. Given the same supplied power, having high absorbed currents circulating in the on-board system leads to technical complications (for example, you may need cables with a larger section or more powerful electric actuators with greater dimensions) and, as a consequence, to an increase in the costs to be borne.

Hence, an electric power system supplied at 48 Volt leads to advantages in the powering of all those devices characterized by high absorbed powers, such as for example electric heaters, liquid pumps, cooling fans, air conditioning systems, hi-fi systems, navigators, displays, etc. Therefore, different solutions were suggested, in which an auxiliary electric power system supplied at 48 Volt, typically a lithium-ion battery, assists the traditional electric power system supplied at 12 Volt. The two electric power systems supplied at 12 and 48 Volt, respectively, are connected to one another with a parallel configuration; between the two storage systems of the two electric power systems supplied at 12 and 48 Volt there is interposed an electronic power converter, typically a DC/DC converter, which allows energy to be transferred between the two storage systems in a preferential direction, in particular from the 48 Volt electric power system towards the 12 Volt electric power system, but there are also cases in which the DC/DC converter can transfer energy in both directions.

A dual-voltage power supply architecture—namely at 12 Volt and 48 Volt—allows manufacturers to have a greater electrical energy to both minimize inefficiencies and improve the performances of the vehicle, besides allowing manufacturers to use cables with a reduced section and with smaller dissipations, thus with a better efficiency.

However, against a quantity of available power that is even excessive, an electric power supply architecture with dual voltage at 12 Volt and 48 Volt, in which the two electric power systems powered at 12 and 48 Volt, respectively, are arranged in parallel, leads to a remarkable increase in the space taken up and in the expenses to be borne.

DESCRIPTION OF THE INVENTION

The object of the invention is to provide an electric power system provided with a dual-voltage storage assembly for a vehicle, said system being free from the drawbacks of the prior art and, in particular, being easy and cheap to be manufactured.

According to the invention, there is provided an electric power system provided with a dual-voltage storage assembly for a vehicle according to the appended claims.

BRIEF DESCRIPTION OF THE DRAWINGS

The invention will now be described with reference to the accompanying drawings, showing a non-limiting embodiment thereof, wherein.

DETAILED DESCRIPTION

Figure 1:
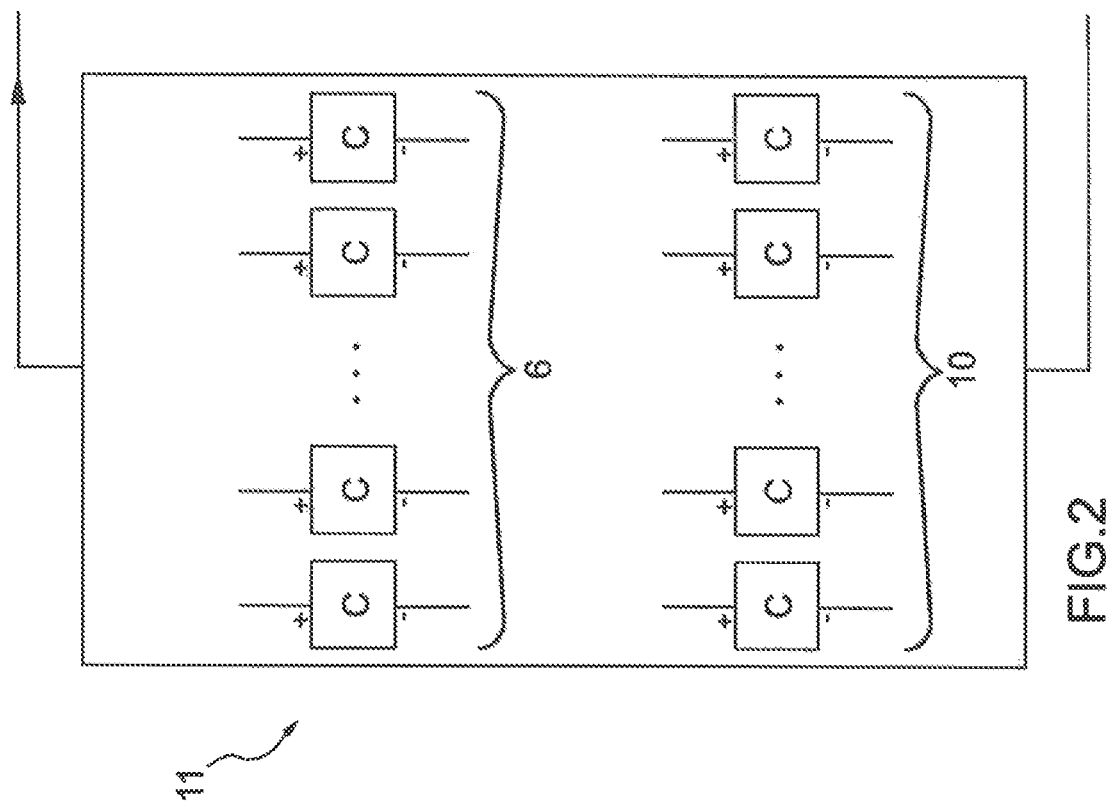
FIG. 1 is a schematic view of a vehicle comprising an electric power system provided with a dual-voltage storage assembly according to the invention.
Figure 2:
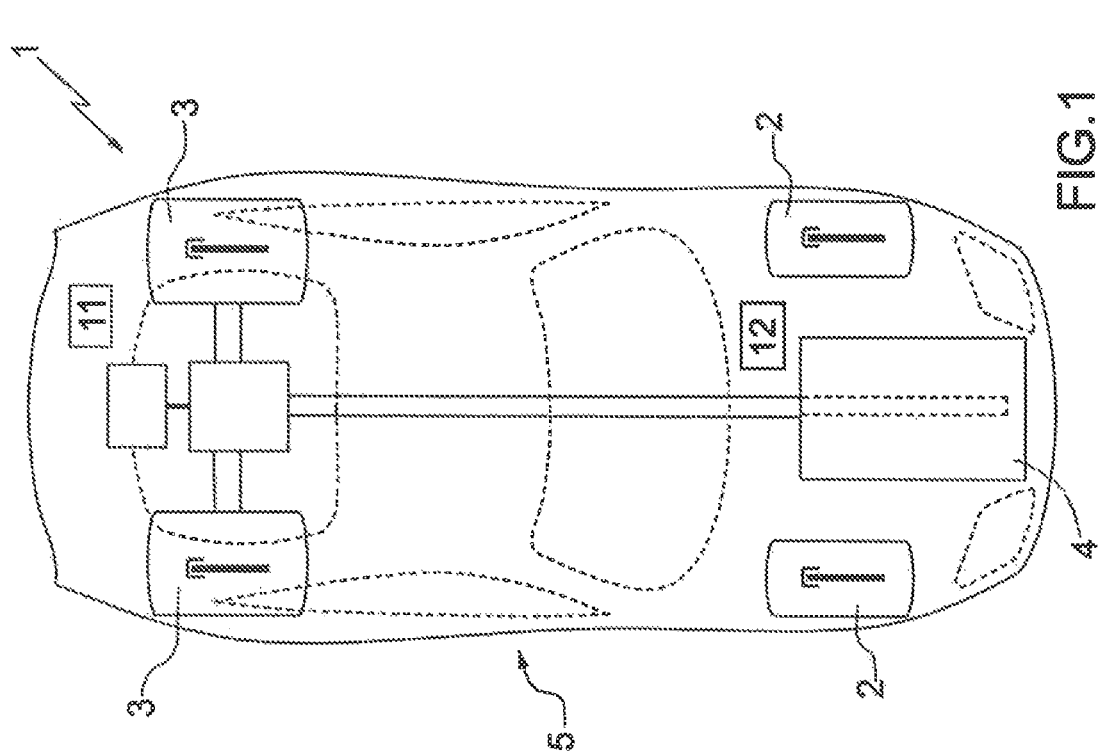
FIG. 2 is a schematic view of a storage system comprising a number of electrochemical cells in the electric power system of FIG. 1.

In FIG. 1, number 1 indicates, as a whole, a road vehicle provided with four wheels, two front wheels 2 and two rear drive wheels 3, which receive the torque from an internal combustion engine 4. The vehicle 1 comprises an electric power system 5, which is shown in detail in FIG. 3 and is provided, in turn, with an electrochemical energy storage system 6, which consists of a series of electrochemical cells.

The storage system 6 preferably is a rechargeable lead battery, which comprises a number of electrochemical cells C, which are electrically connected to one another (in particular, six electrochemical cells C) so as to build a 12 Volt storage system.

The storage system 6 provides electrical energy for the lighting system and for the cranking of the internal combustion engine 4 as well as of further auxiliary loads, which are indicated, as a whole, with number 8. The storage system 6 is arranged in parallel with the auxiliary electric loads 8, which are powered by it with a 12 Volt power supply.

Preferably, the storage system 6 is arranged in parallel to a cold engine cranking module 9; the cold engine cranking module 9 is designed to provide a high power for an amount of time with a limited duration, even at fairly low temperatures.

The cold engine cranking module 9 can also be used for automatic Stop/Start cranking. Alternatively, in case of automatic Stop/Start cranking, a reversible electric machine 12 can be used, which is described more in detail hereinafter.

The electric power system 5 is further provided with a 36 Volt storage system 10. The 36 Volt storage system 10 preferably is a rechargeable lithium-ion battery and comprises a number of electrochemical cells, which are connected to one another. According to a preferred embodiment, the 36 Volt storage system 10 comprises a plurality of electrochemical cells C, which are alternatively arranged with a parallel or series/parallel configuration, so as to build a 36 Volt storage system 10. The 36 Volt storage system 10 is arranged in parallel to the 12 Volt storage system 6.

The assembly 11 formed by the 12 Volt storage system 6 arranged in series to the 36 Volt storage system 10 provides, as a whole, the electrical energy needed to supply power to a plurality of electric loads powered at 48 Volt, indicated—as a whole—with number 13. For example, the assembly 11 formed by the 12 Volt storage system 6 arranged in series to the 36 Volt storage system 10 is designed to provide the electrical energy needed to supply power to the air conditioning system, to heat internal accessories, such as for example the heated rear window and the seats, and to supply power to all the electric loads that usually require high power supply currents. Therefore, the assembly 11 formed by the 12 Volt storage system 6 arranged in series to the 36 Volt storage system 10 is arranged in parallel to the electric loads 13 powered by it with a 48 Volt power supply.

The assembly 11 formed by the 12 Volt storage system 6 arranged in series to the 36 Volt storage system 10 finds advantageous application in case the road vehicle is an electric and thermal hybrid drive road vehicle provided with a hybrid drive motion system comprising the reversible electric machine 12 (i.e. an electric machine that can work both as an electric motor, absorbing electrical energy and generating a mechanical torque, and as an electric generator or as an alternator, absorbing mechanical energy and generating electrical energy), which is mechanically connected to the transmission in order to the transmit the torque to the rear drive wheels 3 or to the front wheels 2. The main technical functions fulfilled by the reversible electric machine 12 concern the operation as electric motor to assist the internal combustion engine 4 by delivering torque during the drive (especially at pickup and at low rpm), the operation as torque generator, the operation in the merely electric driving mode and the operation as generator in regenerative braking or as alternator.

The reversible electric machine 12 comprises, on the inside, an inverter (or electronic power converter), which, during the operation as electric motor, absorbing electrical energy and generating a mechanical torque, is interposed between the reversible electric machine 12 and the assembly 11 formed by the 12 Volt storage system 6 arranged in series to the 36 Volt storage system 10.

The DC/DC converter is a device that connects in parallel the charging capacities of the two storage systems 6, 10 (which, on the contrary, are arranged in series from the point of view of the voltages).

According to a preferred variant, the DC/DC converter is included in a device 14 generally indicated with the term BMS (Battery Management System) for the management of the storage systems 6, 10. In this case, as you can better see in FIG. 3, the BMS device 14 for the management of the storage systems 6, 10 is connected in parallel to the assembly 11 formed by the 12 Volt storage system 6 arranged in series to the 36 Volt storage system 10.

The variant in which the DC/DC converter is included inside the BMS device 14 is particularly advantageous, as it leads to a reduction of the number of components, which significantly affects the costs and the total dimensions. When the DC/DC converter is included inside the BMS device 14, you can use a common cooling system and a common outer housing, you can use the same electric connectors and, furthermore, the functions of the BMS device 14 can be carried out by the main micro-controller of the DC/DC converter.

According to a further variant (not shown herein), the reversible electric machine 12 also includes, on the inside, a DC/DC converter; in this configuration, the reversible electric machine 12 provides, as an output, a dual voltage and, more precisely, a first adjusted voltage towards the 12 Volt storage system 6 and a second adjusted voltage towards the 36 Volt storage system 10, with which charge can be transferred from a to the two storage systems 6, 10 and the current requested by the electric circuits of the vehicle 1 during the normal operation of the internal combustion engine 4 can be supplied.

Finally, according to a further variant (not shown herein), the DC/DC converter is stand alone; in other words, the DC/DC converter is included neither in the BMS device 14 for the management of the storage systems 6, 10 nor in the reversible electric machine 12.

The BMS device 14 for the management of the storage systems 6, 10, which is connected in parallel to the assembly 11 consisting of the 12 Volt storage system 6 arranged in series to the 36 Volt storage system 10, provides the estimation both of the state of charge (SOC) and of the state of health (SOH) of the two storage systems 6 and 10.

Figure 4:
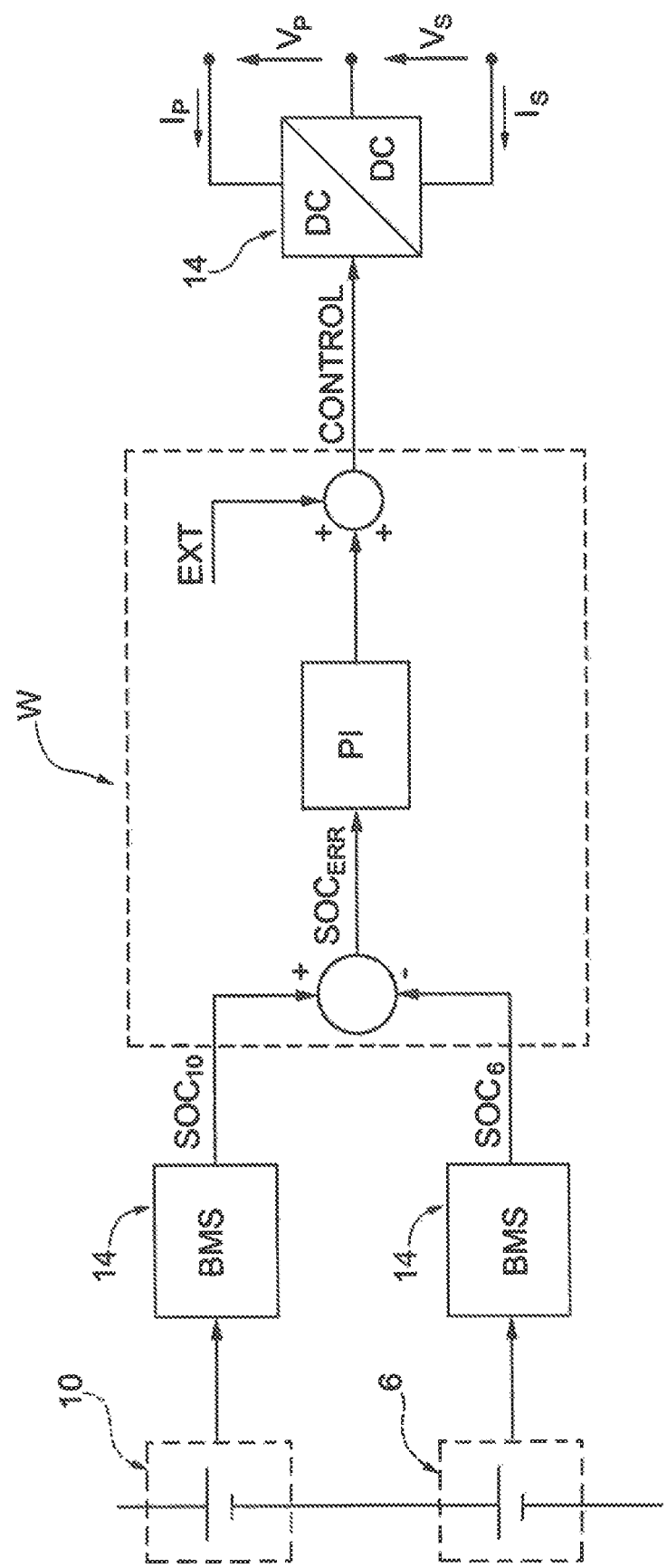
FIG. 4 is a block diagram showing the strategy used to balance the state of charge of the two storage systems of the electric power system of FIG. 1.

In particular, according to FIG. 4, each one of the two storage systems 6 and 10 is connected to the BMS device 14. The BMS device 14 is configured to determine the state of charge (SOC) both of the storage system 6, indicated with $SOC_6$, and of the storage system 10, indicated with $SOC_{10}$. More in detail, the BMS device 14 is configured to acquire (detect) the voltage and current values of the two storage systems 6 and 10, so as to determine, respectively, the state of charge $SOC_6$ of the storage system 6 and the state of charge $SOC_{10}$ of the storage system 10. The electric power system 5 further comprises a control unit CU, which receives, as an input, the values of the state of charge $SOC_6$ of the storage system 6 and of the state of charge $SOC_{10}$ of the storage system 10 and compares them; the control unit CU, indeed, is designed to calculate an error value of the state of charge, indicated with $SOC_{ERR}$, through the difference between the state of charge $SOC_{10}$ of the storage system 10 and the state of charge $SOC_6$ of the storage system 6. The error value $SOC_{ERR}$ of the state of charge is sent, as an input, to a controller PI, preferably a proportional-integral controller (which is known and not described in detail). The controller PI is designed to set to zero the difference between the state of charge $SOC_6$ of the storage system 6 and the state of charge $SOC_{10}$ of the storage system 10 and to keep the storage system 11 balanced, namely to set to zero the value $SOC_{ERR}$ of error of the state of charge between the storage system 10 and the storage system 6.

In case the value $SOC_{ERR}$ of error of the state of charge is close to zero, the control unit CU is designed to control the DC/DC converter so that it provides, as an output, a pair of voltages $V_P$ and $V_S$ that are such that the respective currents $I_P$ and $I_S$ are equal to zero and there is no transfer of energy between the two storage systems 6 and 10, which are substantially balanced.

On the contrary, in case the value $SOC_{ERR}$ of error of the state of charge is substantially different from zero, the control unit CU is designed to control the DC/DC converter so that it provides, as an output, a pair of voltages $V_P$ and $V_S$ that are such that the respective currents $I_P$ and $I_S$ are not equal to zero (other than zero) and there is a transfer of energy between the two storage systems 6 and 10. In particular, the control unit CU is designed to control the DC/DC converter so as to set to zero the difference between the state of charge $SOC_6$ of the storage system 6 and the state of charge $SOC_{10}$ of the storage system (namely, to set to zero the error value $SOC_{ERR}$ of the state of charge) in order to re-establish a balance between the two storage systems 6 and 10; in particular, the difference between the state of charge $SOC_6$ of the storage system 6 and the state of charge $SOC_{10}$ of the storage system 10 is set to zero by transferring energy from the storage system 6 to the storage system 10 (in case the error value $SOC_{ERR}$ of the state of charge is smaller than zero), and—vice versa—from the storage system 10 to the storage system (in case the error value $SOC_{ERR}$ of the state of charge is greater than zero).

According to a preferred variant, the control unit CU is designed to control the DC/DC converter so as to bypass the controller PI in case a different control action is requested for particular needs (indicated with EXT in FIG. 4). In other words, the control unit CU is designed to ignore the error value $SOC_{ERR}$ of the state of charge in case a different control action is requested for particular needs. For example, it can happen that the error value $SOC_{ERR}$ of the state of charge is close to the zero (which means that the DC/DC converter should be controlled so as to provide, as an output, a pair of voltages $V_P$ and $V_S$ that are such that the respective currents $I_P$ and $I_S$ are equal to zero and there is no transfer of energy between the two storage systems 6 and 10), but it is however necessary to control the DC/DC converter so as to transfer energy from the storage system 10 to the storage system 6 in order to deal with a strong absorption of energy by the storage system 6.

The BMS device 14 for the management of the storage systems 6, 10 is designed to carry out the balancing of the electrochemical cells C of the 36 Volt storage system 10 through passive or active elements, which are arranged in parallel on each single electrochemical cell C. The charge balancing function is aimed at transferring a portion of the charge of an electrochemical cell C towards a different electrochemical cell C, preferably placed immediately nearby, or at dissipating, through a passive element of the resistive type, part of the charge of the electrochemical cell C.

For each single electrochemical cell C there are available a plurality of reference parameters, which are used by the BMS device 14 for the management of the storage systems 6, 10 in order to monitor the correct operation of the storage systems 6, 10 so as to control and manage the supply of power to the plurality of electric loads 13 powered at 48 Volt.

In particular, the BMS device 14 for the management of the storage systems 6, 10 is provided with the voltage measure at the ends of the single electrochemical cells C of the 36 Volt storage system 10, with the current flowing through said electrochemical cells C and with the temperature of said electrochemical cells C. For the 12 Volt storage system 6, the BMS device 14 for the management of the storage systems 6, 10 is provided with the voltage measure at the ends, with the current flowing through it and, preferably, with the temperature. As already mentioned above, the values of the voltage measure at the ends, of the current and of the temperature of the two storage systems 6, 10 are used to estimate the state of charge SOC of the two storage systems 6, 10 and to determine a reliable estimate of the state of health SOH of the two storage systems 6, 10.

Based on the state of charge SOC of each single storage system 6, 10, on the state of health SOH of each single storage system 6, 10 and on the reference parameters of each single electrochemical cell C of the storage system 10 and of the storage system 6, the BMS device 14 for the management of the storage systems 6, 10 controls the DC/DC converter so as to keep the state of charge SOC of the storage system 6 balanced relative to the state of charge SOC of the storage system 10.

More precisely, the function fulfilled by the DC/DC converter is that of transferring the electric charge of the 36 Volt storage system 10 to the 12 Volt storage system 6 and vice versa, depending on the state of charge of the two storage systems 6, 10 and depending on the relative charging or draining currents that, from the reversible electric machine 12, flow towards storage systems 6, 10 or that, from the two storage systems 6, 10, flow towards the relative loads powered at 12 or 48 Volts, in order to keep the state of charge of the two storage systems 6, 10 balanced relative to one another.

Figure 3:
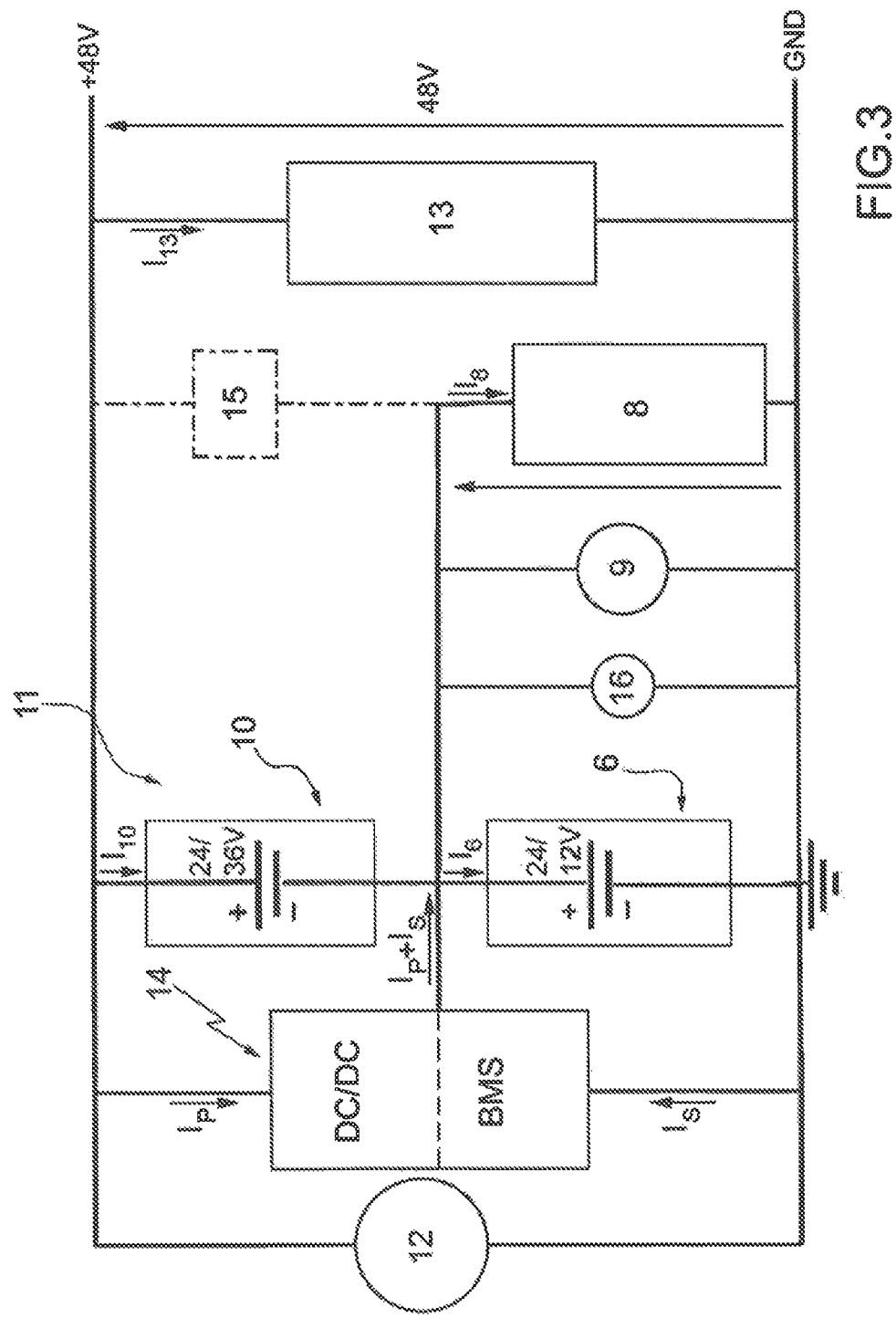
FIG. 3 is a schematic view of the electric power system of FIG. 1.

In FIG. 3, number 14 indicates the assembly consisting of the BMS device 14, which includes, on the inside, the DC/DC converter. $I_8$ and $I_{13}$ indicate, respectively, the input currents of the auxiliary electric loads 8 and of the loads 13 powered at 48 Volt (according to convention, the currents $I_8$ and $I_{13}$ are supposed to be positive when they enter the auxiliary electric loads 8 and the electric loads 13 powered at 48 Volt). Clearly, since both the auxiliary electric loads 8 and the electric loads 13 powered at 48 Volt are merely dissipative loads, the currents $I_8$ and $I_{13}$ are greater than zero.

$I_P$ and $I_S$ indicate, respectively, the output currents of the storage system 10 (which is connected to the primary side of the DC/DC converter) and of the storage system 6 (which is connected to the secondary side of the DC/DC converter) (according to convention, the currents $I_P$ and $I_S$ are supposed to be positive when they leave the storage system 10 and the storage system 6). Finally, $I_{10}$ and $I_6$ indicate, respectively, the input currents of the storage system 10 and of the storage system 6 (according to convention, the currents $I_{10}$ and $I_6$ are supposed to be positive when they enter the positive pole, respectively, of the storage system 10 and of the storage system 6).

With reference to FIG. 3, the conditions listed below can occur.

In case the currents $I_P$ and $I_S$ are equal to zero, there is no transfer of energy from the storage system 10 to the storage system 6, and vice versa. The case in which the currents $I_P$ and $I_S$ are equal to zero is fairly frequent and represents the case in which the assembly consisting of the BMS device 14, which includes, on the inside, the DC/DC converter, has no currents neither at the input nor at the output. In this condition, the assembly consisting of the BMS device 14, which includes, on the inside, the DC/DC converter, is substantially isolated both from the storage system 10 and from the storage system 6, both from the auxiliary electric loads 8 and from the electric loads 13 powered at 48 Volt. In this condition, the auxiliary electric loads 8 are exclusively powered by the storage system 6 and, similarly, the electric loads 13 powered at 48 Volts, are exclusively supplied with power by the assembly 11 consisting of the storage system 6 and of the storage system 10.

In case the currents $I_P$ and $I_S$ are greater zero, there is a transfer of energy from the storage system 10 to the storage system 6. In this condition, the reversible electric machine 12 can work as an electric generator, absorbing mechanical energy and generating electrical energy, or as an electric motor, absorbing electrical energy and generating mechanical energy, or it can neither generate nor absorb electrical energy. The auxiliary electric loads 8 are powered by the storage system 6 and by the storage system 10 through the DC/DC converter; whereas the electric loads 13 powered at 48 Volt are supplied with power by the assembly consisting of the storage system 10 in series to the storage system 6, which cooperate so as to supply power to the electric loads 13 powered at 48 Volt in a differentiated manner depending on the currents $I_P$ and $I_S$.

The storage system 10 connected to the primary side of the DC/DC converter, through the assembly consisting of the BMS device 14, which includes, on the inside, the DC/DC converter, powers the parallel made up of the storage system and the auxiliary electric loads 8. The following conditions can occur:

the input current $I_6$ of the storage system 6 is greater than zero and the storage system 10 connected to the primary side of the DC/DC converter is powering the auxiliary electric loads 8 and, at the same time, is charging the storage system 6; or the input current $I_6$ of the storage system 6 is equal to zero and the storage system 10 connected to the primary side of the DC/DC converter is exclusively powering the auxiliary electric loads 8 (the storage system 6 is substantially isolated); or the input current $I_6$ of the storage system 6 is smaller than zero and both the storage system 10 connected to the primary side of the DC/DC converter and the storage system 6 connected to the secondary side of the DC/DC converter are jointly powering the auxiliary electric loads 8.

In case the currents $I_P$ and $I_S$ are smaller zero, there is a transfer of energy from the storage system 6 to the storage system 10. The case in which the currents $I_P$ and $I_S$ are smaller than zero represents a very disadvantageous and energetically inefficient condition. For this reason, there is a tendency to try and avoid this operating mode, which—though—is necessary in case there is a high demand of power from the electric loads 13 powered at 48 Volt and the assembly consisting of the storage system 10 in series to the storage system 6 provides the maximum power available.

Basically, the electric power system 5 comprises a 12 Volt storage system 6, which supplies power to the loads at 12 Volt, an assembly 11 consisting of the 12 Volt storage system 6 and of the 36 Volt storage system 10, which supplies power to the electric loads 13 at 48 Volts; the electric power system 5 further comprises transferring the charge between the two storage systems 6, 10 by means of the DC/DC converter, so as to keep the state of charge of the two storage system 6, 10 as balanced as possible.

According to a preferred variant, the electric power system 5 is not provided with an alternator usually used in traditional electric power systems for charging the 12 Volt storage system 6. The 12 Volt storage system 6 is charged by the reversible electric machine 12 or by the 36 Volt storage system 10 through the DC/DC converter. We would like to point out that this embodiment without alternator allows manufacturers to significantly reduce the costs of the electric power system 5.

According to a further variant, on the contrary, the electric power system 5 is provided with an alternator 16 for charging the 12 Volt storage system 6, which is arranged in parallel to the 12 Volt storage system 6. According to embodiments that are alternative to one another, the alternator 16 can be self-standing or included in the cold engine cranking module 9, in which case the cold engine cranking module 9 is a reversible electric machine also acting as a generator.

The sizing from the point of view of the capacitance (expressed in Wh or in Ah) of the two storage systems 6, 10 is carried out so as to minimize the total cost of the assembly 11 and based on parameters such as inner resistance of the two storage systems 6, 10, voltage ratio between the two storage system 6, 10, mean and maximum current absorbed by the loads 8, 9, 12, 13 connected in parallel to the 12 Volt storage system 6 and to the 48 Volt storage assembly 11.

According to a preferred variant, depending on the current cost of lithium batteries and of lead batteries, in order to minimize the total cost of the assembly 11 given the same performances, the ratio between the capacitances expressed in Ah of the two storage systems 6, 10 ranges from 4 to 8.

Furthermore, the 36 Volt storage system 10 can be used as an additional source of voltage at 36 Volt for special electric loads, in case a negative voltage is needed; the negative pole of the 12 Volt storage system 6 has, indeed, a negative voltage compared to the negative pole of the 36 Volt storage system 10.

According to a further embodiment typical for industrial vehicles, the storage system 6 comprises twelve electrochemical cells C to form a 24 Volt storage system. The electric power system 5 is further provided with a 24 Volt storage system 10, which is obtained by means of a rechargeable lithium-ion battery and comprises a number of electrochemical cells C, which are connected to one another and arranged alternatively in a series or series/parallel arrangement.

The electric power system 5 described above and provided with the device 14 for the management of the storage systems 6, 10 has some advantages. Indeed, said electric power system 5 is simple and cheap to be manufactured and the device 14 for the management of the storage systems 6, 10 requires a small calculation capacity. At the same time, the electric power system 5 enables an electric power supply architecture with a dual voltage at 12 Volt and 48 Volt, but it is small-sized and, especially, economic compared to an electric power supply architecture with a dual voltage at 12 Volt and 48 Volt, in which the 12 Volt storage system 6 is arranged in parallel to a 48 Volt storage system. Further advantages lie in the fact that the electric power system 5 does not lead to cold engine cranking problems, as you can use both the 12 Volt storage system 6 and the 36 Volt storage system 10. Furthermore, the DC/DC converter of the electric power system 5 described above typically has a more limited power (1.5-2 kWatt) than traditional electric power systems (2.5-3.5 kWatt), in which the 12 Volt and 48 Volt storage systems are arranged in parallel and the 12 Volt storage system is exclusively charged by the 48 Volt storage system. In the electric power system 5 described above, the 12 Volt storage system 6 is charged both by the 36 Volt storage system 10 through the DC/DC converter and by the reversible electric machine 12 at 48 Volt with higher efficiencies (indeed, the efficiencies of the DC/DC converter are generally higher, as the ratio between input/output voltage is 12/36 instead of 12/48, the currents are generically more contained and the electronic devices have lower resistances) and significant reductions in the costs of the DC/DC converter, which can be obtained by means of a technology using standard, low-cost printed circuit boards.

The invention claimed is:
1. An electric power system for a vehicle provided with a storage assembly designed to supply power with a dual voltage, wherein a first power supply being at 48 Volt comprising
a first storage system with a number of electrochemical cells (C) connected to one another in series and/or in parallel:

a second storage system arranged in series to the first system and with a number of electrochemical cells (C) connected to one another in series and/or in parallel;

wherein the second storage system provides the electrical energy needed to recharge the first storage system and the first storage system is designed to provide the electrical energy needed to recharge the second storage system and both storage systems provide the electrical energy needed to supply power to a number of first loads supplied at 48 Volt;

a reversible electric machine, which can work both as an electric motor, absorbing electrical energy and generating a mechanical torque, and as an electric generator, absorbing mechanical energy and generating electrical energy;

a DC/DC converter, which is designed to transfer the electric charge from the second storage system to the first storage system, and vice versa, and comprising a BMS device for the management of said storage assembly, said BMS device being designed to carry out the balancing of the electrochemical cells (C) of the second storage system and to estimate the state of charge (SOC) and the state of health (SOH) of the two storage systems, and wherein DC/DC converter is integrated in the BMS device for the management of the storage assembly; and a plurality of second loads powered with a second power supply at 12 Volt;

wherein the second storage system, through the DC/DC converter, directly provides the electrical energy needed to supply power to said second loads and the first storage system is designed to provide further energy to said second loads, in case the electrical energy provided by the second storage system is not sufficient for their sustenance.

2. The system according to claim 1, wherein the first storage system is a lead battery rechargeable at 12 Volt or at 24 Volt.

3. The system according to claim 1, wherein the second storage system is a lithium-ion battery rechargeable at 24 Volt or at 36 Volt.

4. The system according to claim 1, wherein the BMS device for the management of the storage assembly is connected in parallel to said storage assembly.

5. The system according to claim 1, wherein the second storage system, through the DC/DC converter, is electrically connected to the first storage system so as to supply power to a cold engine cranking module, which is designed to provide a high power for an amount of time with a limited duration during a cold engine cranking phase and during Stop/Start cranking.

6. The system according to claim 1, wherein the DC/DC converter is designed to transfer the electric charge from the second storage system to the first storage system, and vice versa, so as to keep the state of charge (SOC) of the two storage systems balanced in time.

7. The system according to claim 6 and comprising a control unit (CU), which is designed to determine the state of charge ($SOC_6$) of the first storage system; to determine the state of charge ($SOC_{10}$) of the second storage system; and to transfer the electric charge from the second storage system to the first storage system, and vice versa, based on the comparison between the state of charge ($SOC_6$) of the first storage system and the stare of charge ($SOC_{10}$) of the second storage system.

8. The system according to claim 1, wherein the second storage system is used to supply power to dedicated loads and the storage assembly is designed to provide power supply at a third voltage; wherein the chassis of the vehicle provides a negative potential relative to the negative pole of the second storage system.

9. The system according to claim 1, wherein the system is not provided with an alternator arranged in parallel to the first storage system in order to recharge it.

10. The system according to claim 1, wherein the reversible electric machine is designed to work as a generator and to directly supply power to a plurality of electric loads through the DC/DC converter, at the same time minimizing the recharging current towards the storage assembly.

* * * * *